United States Patent [19]

McGee

[11] 4,307,745
[45] Dec. 29, 1981

[54] BACKSEATING AND STOP FOR VALVE OPERATOR

[75] Inventor: John K. McGee, Houston, Tex.

[73] Assignee: Combustion Engineering, Inc., Windsor, Conn.

[21] Appl. No.: 125,047

[22] Filed: Feb. 27, 1980

Related U.S. Application Data

[63] Continuation-in-part of Ser. No. 955,232, Oct. 27, 1978, Pat. No. 4,245,661.

[51] Int. Cl.³ .................... F16K 31/50; F16K 3/314
[52] U.S. Cl. .................................. 137/72; 251/214; 251/330
[58] Field of Search .............. 251/266, 267, 330, 214, 251/327; 137/72

[56] References Cited

U.S. PATENT DOCUMENTS

| | | | |
|---|---|---|---|
| Re. 29,679 | 6/1978 | Boitnott | 251/214 |
| 1,976,796 | 10/1934 | Milner | 251/266 |
| 3,349,789 | 10/1967 | Crain et al. | |
| 3,710,860 | 1/1973 | Holbert, Jr. | |
| 3,789,875 | 2/1974 | McGee | |
| 3,990,679 | 11/1976 | Boitnott | 251/214 |
| 4,125,060 | 11/1978 | McGee | |
| 4,138,091 | 2/1979 | McGee | 251/327 X |
| 4,149,558 | 4/1979 | McGee | 251/214 X |

Primary Examiner—Arnold Rosenthal
Attorney, Agent, or Firm—Cushman, Darby & Cushman

[57] ABSTRACT

In a gate valve, which has a backseat which is made up only when the normally non-rising operator stem is permitted to rise a short distance, and in order that a smaller-diameter stem may be used than one which is of sufficient area where it passes through the stem packing to cause the internal pressure within the valve cavity to generate sufficient force to overcome the frictional forces resisting stem movement developed by the internal pressure between the gate plates and the seats, so that the stem may rise when it is supposed to, to make the backseat, a system of clearances is provided between the stem nut and the gate plates. A different stop arrangement is shown for limiting rising of the gate, for defining the fully open position of the gate.

6 Claims, 3 Drawing Figures

BACKSEATING AND STOP FOR VALVE OPERATOR

REFERENCE TO RELATED APPLICATION

This is a continuation-in-part of my copending U.S. patent application Ser. No. 955,232, filed Oct. 27, 1978, now U.S. Pat. No. 4,245,661, dated Jan. 20, 1981.

BACKGROUND OF THE INVENTION

When a presently conventional Graygate gate valve of Gray Tool Company, Houston, Tex., U.S.A. is operating in an open position under pressure and then closed, the pressure is trapped within the valve cavity. With the valve closed, this internal pressure acts against the gate segments forcing said segments against the valve seats. This same pressure also acts against the cross-sectional area of the stem. Thus, the area of the stem where it passes through the stem packing must be of such area to cause the internal pressure to generate sufficient upward force to overcome the frictional forces resisting stem movement developed by the internal pressure between the gates and seats, thereby allowing the stem to rise and engage the backseat.

In a conventional safety valve of the gate valve type, such as shown in McGee, U.S. Pat. No. 3,789,875, issued Feb. 5, 1974, the stem diameter is made large enough to overcome the frictional forces thereby insuring that the stem will always move. The valve development of the present invention is most closely related to the valve developments shown in McGee et al, U.S. Pat. No. 4,149,558, and in McGee commonly assigned copending U.S. Pat. application Ser. No. 955,232, filed Oct. 27, 1978.

SUMMARY OF THE INVENTION

In a gate valve, which has a backseat which is made up only when the normally non-rising operator stem is permitted to rise a short distance, and in order that a smaller-diameter stem may be used than one which is of sufficient area where it passes through the stem packing to cause the internal pressure within the valve cavity to generate sufficient force to overcome the frictional forces resisting stem movement developed by the internal pressure between the gate plates and the seats, so that the stem may rise when it is supposed to, to make the backseat, a system of clearances is provided between the stem nut and the gate plates. A different stop arrangement is shown for limiting rising of the gate, for defining the fully open position of the gate.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION OF THE PRESENTLY PREFERRED EMBODIMENT

Figure 1:
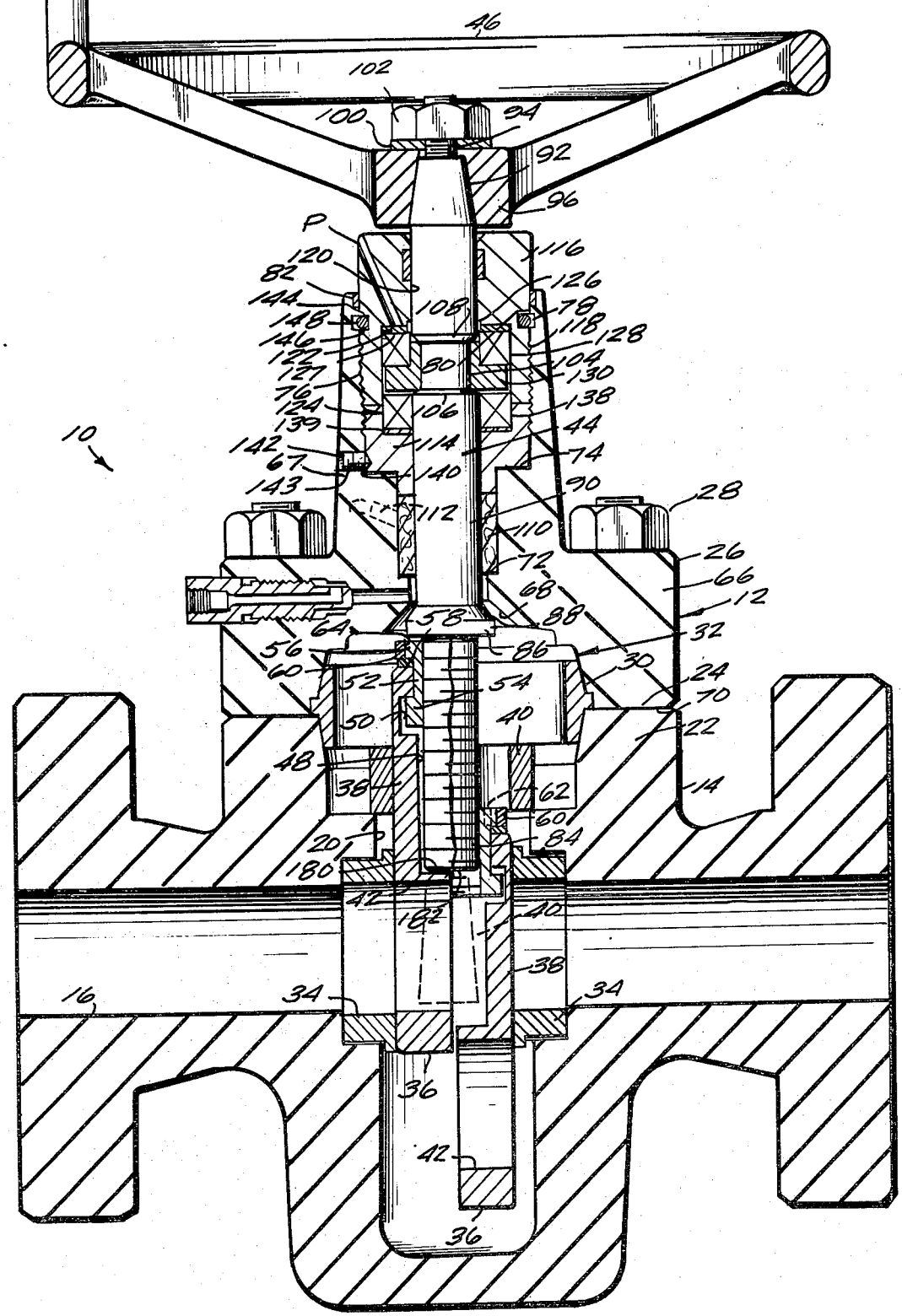
FIG. 1 is a fragmentary vertical longitudinal sectional view of a gate valve provided with the improved backseat and stop of the invention. To the right of its center line the valve gate is shown in a lowered, closed condition and to the left the valve gate is shown in a raised, open condition.

In the following description, the improved backseat and stop are disclosed as provided on a gate valve which in accordance with the disclosure in the aforesaid parent application has a fusible portion which permits activation of the backseat by melting out of a prohibiting relationship, as further described in detail below.

(In the valve disclosed in the aforesaid parent application, a valve operator that is provided with a backseat which comes into use when the normally non-rising stem operator and its bearing-enclosing bonnet gland are raised, e.g. so that stem packing can be replaced, is further provided with another way to actuate the backseat, one which will come into play should the valve be subjected to heat of sufficient intensity as to call the integrity of the stem packing or other critical parts into question. The further activation mode depends on the melting of fusible material which permits the operator and its bearings to rise relative to the bonnet.)

Actually, the prohibiting function could be served by other means, such as a physically removable spacer part, as will be understood by those skilled in the art. Accordingly, the description relating to the fusible part should be taken as exemplary of the broader principle just outlined.

In the figures, there is shown a gate valve 10 having a housing 12 which includes a body 14. The body has a longitudinal throughbore 16 to provide a flow passageway. At the ends of the bore 16, the body is provided with flanges wherewith the valve may be connected in a conduit to provide means for controlling fluid flow through the conduit.

Intermediate the ends of the bore 16 there is provided a valve chamber 20 which includes a transverse passageway which intersects with the bore 16 and opens outwardly through the body at a tubular boss 22. The boss 22 is provided with a flat outer end surface 24.

The housing 12 further includes a valve bonnet 26 that is mated with the surface 24 and secured to the body, e.g. by bolts 28. A sealing ring 30 is interposed between the body and bonnet to provide sealed integrity for this juncture.

The bonnet 26 is an annular or tubular element, in the sense that it has a coaxially disposed bore 32.

Within the chamber 20, valve seats 34 are provided at the intersections with the throughbore 16, and a valve gate 36 is received for sliding transversally of the throughbore 16. The gate 36 is shown including a pair of gate plates 38, and the valve is shown including an expander 40 which serves to force the plates against the seats 34 when the valve is closed, and to withdraw that force as the gate is opened.

Figure 2:
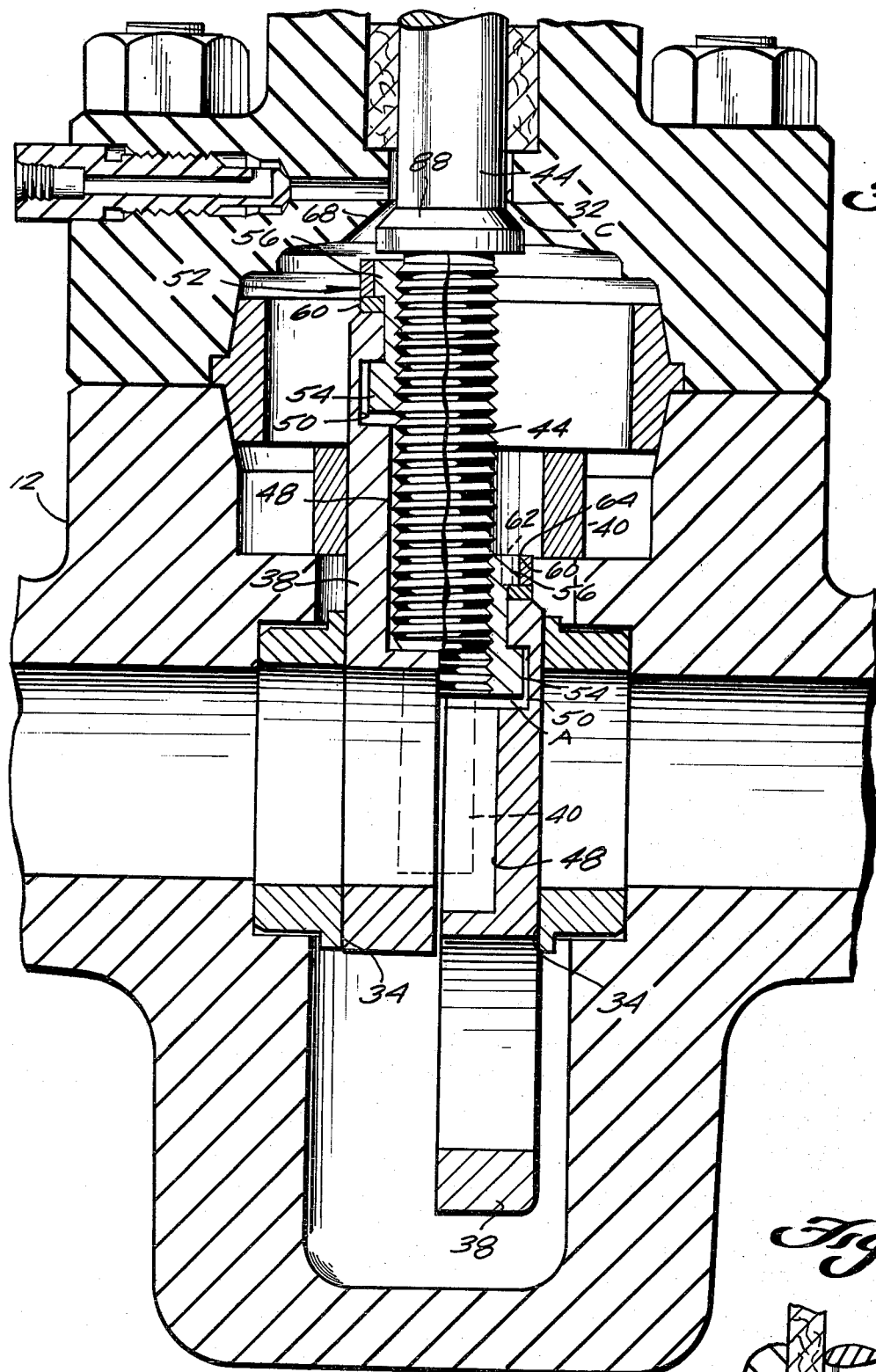
FIG. 2 is a larger scale view of a portion of what is shown in FIG. 1 in order to better illustrate details of the preferred backseat and stop arrangement.

In FIGS. 1 and 2, the gate is shown in its raised, open position at the left, and in its lowered, closed position at the right. When the gate is open, the openings 42 through the respective gate plates are both axially aligned with the valve body throughbore 16. When the gate is closed, the blank regions of the respective gate plates are pressed against the respective valve seats 34.

A valve stem 44 is threadably connected to the gate and passes out of the housing 12 through the bore 32 of the bonnet. Outside the housing, an operator 46 is secured on the stem 44. In the instance shown, the operator 46 is a handwheel that is designed to be manually rotated in one angular sense to raise the gate and open the valve, and to be manually rotated in the opposite angular sense to lower the gate and close the valve. Other operators may be used.

The particular connecting means illustrated in the Figure for threadably connecting the gate to the valve stem are shown and described in detail in the U.S. patent of McGee U.S. Pat. No. 4,138,091 issued Feb. 6, 1979. Suffice it to say here that an upwardly open generally cylindrical socket 48 is formed in the gate. The socket 48 includes a coaxially annular groove 50 near its upper end. A generally semi-cylindrical half of the socket 48 is formed in the inner side of each gate plate so the halves confront one another to constitute the socket 48.

An internally threaded, generally tubular drive nut is shown provided at 52. The drive nut 52 has a coaxially annular rib 54 formed on the exterior thereof axially intermediate the ends thereof. A coaxially annular flange 56 is formed on the upper end of the drive nut. The drive nut 52 is received in the socket 48 with the rib 54 projected into the groove 50 and the flange 56 located above the upper ends 58 of the gate plates 38. The flange 56 is radially surrounded by a torque plate 60 which is pinned at 62 to each of the gate plates distally of the socket 48. The radially inner surface of the plate 60 and the radially outer surface of the flange 56 are provided with splines 64. These interdigitate to prevent relative rotation between the flange 56 and the plate 60 yet permit a small amount of relative axial motion. Further locking means (not shown) may be provided to secure the flange 56 and plate 60 together and/or these elements may be formed integrally and the splines 64 omitted.

Further details of the valve stem 44 and bonnet 26 will now be described so that the structure and operation of the invention will become better understood.

The bonnet 26 includes a generally radially extending base flange 66 and a tubular portion 67 extending coaxially upwardly therefrom. The bore 32 passes through both portions. Where the bore 32 emerges into the valve chamber, there is a frusto-conical annular seat 68 coaxially formed at the juncture of the bore 32 with the underside 70 of the flange 66.

A short way axially above the seat 68, the generally cylindrical bore 32 undergoes a first abrupt enlargement in radius, providing a first upwardly facing shoulder 72. Axially further up, the bore 32 undergoes a second abrupt enlargement in radius, providing a second upwardly facing shoulder 74, within the tubular portion 67.

An axially intermediate portion of the bore 32 within the tubular portion 67 of the bonnet is internally threaded at 76. Above the threaded portion 76, the bore 32 is provided with a radially shallow, axially broad circumferential recess 78, delimited at the top by a radially inwardly projecting annular rib 80. Above the rib 80, weather seal 82 is provided in the bore 32.

The valve stem 44 has an externally threaded lower portion 84 that is received within the gate socket and threadably connected with the gate as described above. Just axially above where the stem 44 emerges through the drive nut 52, there is a circumferentially extending boss 86 formed coaxially thereon. The axially upper end surface or shoulder 88 of the boss is frusto-conically tapered, complementarily with the seat 68.

In normal use, as shown in FIGS. 1 and 2, the shoulder 88 remains clear of the seat 68 and there is a significant distance located axially between these two surfaces, as shown.

Above the boss 86, the stem 44 has an axially long, cylindrical, unthreaded portion 90. Axially beyond its emergence from the bore 32 of the bonnet, the stem undergoes a gradual reduction in radius to provide a tapered band 92. Above the band 92, the stem 44 has an externally threaded shank 94 leading to its upper end. The band 92 mounts the complementarily tapered hub 96 of a handwheel 46. A washer 100 and nut 102 are mounted on the shank 94 to removably secure the handwheel on the stem 44.

Within the tubular portion of the bonnet, the cylindrical portion 90 of the stem is coaxially provided with a radially shallow, axially broad recess 104, having opposed, facing shoulders 106, 108.

A packing assembly 110 comprising a stack of chevron packing elements is received in the annulus about the stem that is bottomed on the first shoulder 72. As shown, the assembly 110 is of the type that is energized by an injection of plastic material through an injection port 112 after installation.

An annular packing gland 114 is received in the annulus about the stem that is bottomed on the second shoulder 74 and projects therebelow, backing the packing assembly 110.

A bonnet gland 116 also is provided, generally in the form of an exteriorly threaded tubular element having an external, axially intermediate band of threading 118 and a throughbore 120 which undergoes an abrupt decrease in radius intermediate the axial extent thereof, to provide a downwardly facing shoulder 122. The larger radius portion leading to the shoulder 122 constitutes a cup for receipt of the bearing assembly 124 for the valve stem. As shown, there is provided a bearing bushing 126, a washer-like annular disk of fusible material 127, a roller bearing 128, a stem split ring 130, a roller bearing 138, and a spring washer 139.

After the packing assembly and packing gland are installed, the bearing assembly and bonnet gland are installed and the bonnet gland is threaded into place until the packing gland 114 is properly compressed.

Below the band of threading 118, the bonnet gland is coaxially provided with a shallow circumferential recess 140. A set screw 142 is installed through a threaded opening 143 in the tubular portion of the bonnet 26 until it projects into the recess 140. When so installed, the set screw 142 prevents the bonnet gland from being rotationally backed out. (In practice several set screws 142 are provided angularly of the bonnet 26.)

Above the band of threading 118, the bonnet gland is externally coaxially provided with a shallow recess 144, at least including a lower, generally upwardly facing shoulder 146.

A bonnet gland retainer wire 148 is snapped into the pocket formed by the confronting recesses 144 and 78. The pocket 144, 78 is axially longer than the gage of the wire 148.

In day-to-day operations under normal conditions, when the valve is opened, the bearings in the bonnet prevent the stem 44 from rising. At the level in raising the gate where the gate has been so fully raised that the gate openings 42 are fully aligned with flow passageway 16 of the housing, the floor surface 180 at the base of the socket 48 has risen into engagement with the lower end 182 of the stem 44, thus providing a positive stop against further raising of the gate, in normal conditions.

However, in use, with the valve open and subjected to pressure of fluid being confined or transported in the piping system in which the valve is installed, a leak may occur in the packing assembly. Under such circumstances it may be necessary to change the packing assembly while the valve remains installed in the line and open.

The construction just described makes such a repair feasible, by making the following procedure possible.

The set screws 142 are backed out until they are withdrawn from the recess 140. Then the bonnet gland 116 is backed out a few turns, limited by pinching of the retainer wire 148 between the upper end wall of the recess 78 and the lower end wall 146 of the recess 144.

The normally non-rising stem 44 may then be raised and tensioned to form a metal to metal seal between the shoulder 88 and the seat 68. While a positive seal remains established, the retainer wire 148 is snapped out, the gland 116 is backed out, the bearing assembly 124 is removed, the packing gland 114 is removed, the packing assembly 110 is removed and replaced, the packing gland 114 is reinstalled, the bearing assembly 124 is reinstalled, the gland 116 is threaded mostly in and the packing 110 is energized at 112. The packing is tested for leakage by reinstalling the retainer wire 148, tightening the gland 116 and turning the stem 44 which disengages the metal seal that was maintained at 88, 68.

The heat-responsive material of the annular disk 127 is a fusible, preferably metallic material, e.g. of a composition such as is disclosed in the U.S. Pat. Nos. of Allen, 3,788,600 issued January, 1974 and Wicke, 3,771,540 issued Nov. 13, 1973, Wicke 3,842,854 issued Oct. 22, 1974 and Wicke 3,896,835 issued July 29, 1975, and it is shown axially interposed between the upper stem bearing and the bonnet gland. Should a fire or the like occur, such as would likely destroy the stem packing 110, the annular disk 127 will melt and its molten residue will flow out the ports P provided in communication with the site of the disk 127 through the bonnet gland. Then the remainder of the valve stem bearing assembly and the valve stem will rise, until the back seat is established at 88/68, preventing leakage. Later, the valve may be repaired, if damage is not too great, by the replacement of the packing and of the fusible annular disk 127.

Figure 3:
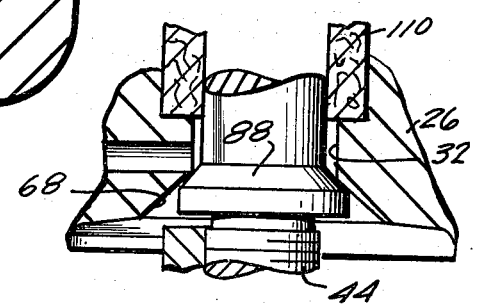
FIG. 3 is a view of the same scale of what is shown in FIG. 2, but after the stem has risen to effect the backseat between the stem and the bonnet.

Looking carefully now at FIGS. 2 and 3, it will be apparent that the annular groove 50 in the gate plates 38 is axially longer (e.g. vertically) than the axial thickness of the annular rib 54 on the drive nut 52 by an amount indicated at A in FIG. 2 below the rib 54. This extra space A is axially at least as great as, and preferably slightly greater than the vertical distance C which normally (as shown in FIG. 2) separates the backseat sealing surfaces 88 and 68. Accordingly, when the valve stem 44 rises from its FIG. 2 position to its FIG. 3 position to provide a backseat at 88, 68, the valve gate need not rise at all. Because a limited axial clearance has been provided for tne annular rib 54 within the groove 50, there is no need to shift the gate plates upward to achieve the backseat. Thus, there is no requirement for dragging the gate plate sealing faces upwards relative to the valve seats at 34. Accordingly, backseating will unfailingly occur, even though the valve stem 44, where it passes through the bonnet seal assembly may be of relatively small diameter.

It should now be apparent that the improved backseating and stop arrangements for a valve operator as described hereinabove, possess each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. In a normally non-rising stem gate valve in which a valve gate is mounted in a valve chamber that intersects a flow passage within a valve housing, and in which a valve stem projects out through a transverse passageway in the housing from an operative relation with the valve gate, and in which there are:

means defining an annular seat on said valve housing within said valve chamber peripherally of where said transverse passageway intersects said valve chamber;

means defining an annular shoulder on said valve stem normally spaced axially below said annular seat;

means defining a longitudinal throughbore in said housing providing a flow passageway which intersects said transverse passageway and is there provided with annular sealing means;

said valve gate having gate plate means having a blind region and an opening, said valve gate being disposed in the transverse passageway for movement, upon corresponding rotation of said valve stem between a closed condition wherein said blind region is in blocking relation to said flow passageway and said valve gate in said blind region sealingly engages said annular sealing means, and an open condition wherein said opening through said valve gate is axially aligned with said flow passageway;

bearing and sealing means provided within said housing normally in supporting and sealing relation to said valve stem, so that said valve stem normally may be rotated without rising;

said bearing and sealing means incorporating at least one element which may be at least partially removed from bearing relation with said valve stem, whereupon said valve stem is free to rise to an axially limited extent which is equal to the amount by which said annular shoulder on said valve stem is normally spaced axially below said annular seat, the improvement wherein:

said valve gate is connected with said valve stem by securement means which incorporate a limited-extent axial clearance means, for providing an axial lost-motion between said valve stem and said valve gate, when said valve gate is in said closed condition, which axial lost-motion provision is of a magnitude at least as great as the axially limited extent by which said valve stem may rise when said at least one element of said bearing and sealing means is at least partially removed as aforesaid, so that said annular shoulder on said valve stem may rise into backseating relation with said annular seat on said valve housing when said valve gate is in said closed condition, without need for sliding or dragging movement of said valve gate relative to said annular sealing means.

2. The normally non-rising stem gate valve improvement of claim 1, further including:
  means defining an upwardly opening socket in the valve gate;
  said socket having upwardly facing shoulder means therein;
  said valve stem having a lower end portion received in said upwardly opening socket; and
  means defining downwardly facing shoulder means on said valve stem within said socket and arranged to engage said upwardly facing shoulder means of said valve gate upon raising of said gate to said open condition in order to provide a positive stop against further raising of said valve gate relative to said longitudinal passageway.

3. The normally non-rising stem gate valve improvement of claim 1, wherein:
  said bearing and sealing means comprises:
  a first abrupt radial enlargement in said transverse passageway, providing a first upwardly facing shoulder therein spaced axially above said annular seat;
  a second, abrupt radial enlargement in said transverse passageway, providing a second upwardly facing shoulder therein spaced axially above said first upwardly facing shoulder;
  an annulus of packing surrounding said stem in said transverse passageway, said annulus of packing being bottomed on said first upwardly facing shoulder;
  an annular packing gland surrounding said stem in said transverse passageway, said annular packing gland being bottomed on said second upwardly facing shoulder and having a tubular portion extending downwardly into engagement with said annulus of packing;
  an annular bonnet gland surrounding said stem;
  means providing a band of external threading on the bonnet gland and a band of internal threading on the housing, within said transverse passageway, above said second upwardly facing shoulder, said bands being threadably engaged to compress said packing gland axially against said annulus of packing,
  bearing means for said stem, said bearing means being secured between said stem and said bonnet gland;
  whereby the annulus of packing may be replaced even while the valve remains open and in service, by threadably backing out the bonnet gland, axially raising the stem until said annular shoulder on the stem abuts and seals against said annular seat on the valve housing, removing the bonnet gland, packing gland and annulus of packing from the transverse passageway, installing a sound replacement for said annulus of packing, reinstalling the packing gland and bonnet gland, and threadably tightening the bonnet gland and again lowering the valve stem to disengage said annular shoulder on the stem from the annular seat on the valve housing.

4. The normally non-rising stem gate valve improvement of claim 3, wherein:
  said bearing and sealing means is caused to incorporate said at least one element, as follows:
  said bearing means includes, axially interposed between said bearing means and said annular bonnet gland, an annulus of heat-fusible material which is subject to melting and running away should the valve be subjected to a sufficiently hot event, such as a fire which would leave the integrity of the annulus of packing in question, so that, upon melting and running away of the annulus of heat-fusible material, the bearing assembly is effectively axially shortened by an amount sufficient to permit the valve stem to rise until said annular shoulder on the stem abuts and seals against said annular seat on the valve housing.

5. In a gate valve having a normally non-rising valve stem which is rotated in order to raise and lower a valve gate relative to means defining a flow passageway provided in a valve housing:
  a valve bonnet having a tubular portion surrounding the valve stem;
  a bearing assembly housed within said tubular portion and being structurally interposed between the valve stem and the valve bonnet to journal the valve stem for rotation, but not normally for axial movement with respect to the valve bonnet;
  means defining a first annular sealing surface on the valve stem and a second annular sealing surface on the valve bonnet, the first and second annular sealing surfaces normally being axially spaced out of mutual superficial sealing engagement;
  the bearing assembly including as an adjunct thereof a body of heat-fusible material effectively contributing to the axial extent of the bearing assembly, said body of heat-fusible material being subject to melting and flowing away, should the valve be subjected to an unusual condition of heat such as a fire, thereby effectively axially shortening the bearing assembly and thereby permitting limited axial movement of the valve stem, sufficient to superficially, sealingly engage the first and second annular sealing means as a backseat for the valve;
  said valve gate is connected with said valve stem by securement means which incorporate a limited-extent axial clearance means, for providing an axial lost-motion between said valve stem and said valve gate, when said valve gate is in said closed condition, which axial lost-motion provision is of a magnitude at least as great as the axially limited extent by which said valve stem may rise when said body of heat-fusible material melts and flows away, so that said first annular sealing surface on said valve stem may rise into backseating relation with said second annular sealing surface on said valve bonnet when said valve gate is fully closed, without need for sliding or dragging movement of said valve gate relative to said flow passageway means.

6. In a normally non-rising stem gate valve in which a valve gate is mounted in a valve chamber that intersects a flow passage with a valve housing, and in which a valve stem projects out through a transverse passageway in the housing from an operative relation with the valve gate, and in which there are:
  means defining an annular seat on said valve housing within said valve chamber peripherally of where said transverse passageway intersects said valve chamber;
  means defining an annular shoulder on said valve stem normally spaced axially below said annular seat;
  means defining a longitudinal throughbore in said housing providing a flow passageway which intersects said transverse passageway and is there provided with annular sealing means;

said valve gate having gate plate means having a blind region and an opening, said valve gate being disposed in the transverse passageway for movement, upon corresponding rotation of said valve stem, between a closed condition wherein said blind region is in blocking relation to said flow passageway and said valve gate in said blind region sealingly engages said annular sealing means, and an open condition wherein said opening through said valve gate is axially aligned with said flow passageway;

bearing and sealing means provided within said housing normally in supporting and sealing relation to said valve stem, so that said valve stem normally may be rotated without rising;

said bearing and sealing means incorporating at least one element which may be at least partially removed from bearing relation with said valve stem, whereupon said valve stem is free to rise to an axially limited extent which is equal to the amount by which said annular shoulder on said valve stem is normally spaced axially below said annular seat, the improvement including:

means defining an upwardly opening socket in the valve gate;

said socket having upwardly facing shoulder means therein;

said valve stem having a lower end portion received in said upwardly opening socket; and means defining downwardly facing shoulder means on said valve stem within said socket and arranged to engage said upwardly facing shoulder means of said valve gate upon raising of said gate to said open condition in order to provide a positive stop against further raising of said valve gate relative to said longitudinal passageway.

* * * * *